(12) United States Patent
Harpring

(10) Patent No.: US 10,932,892 B2
(45) Date of Patent: Mar. 2, 2021

(54) ORTHODONTIC APPLIANCE CASE

(71) Applicant: Thrine C. Harpring, Centreville, VA (US)

(72) Inventor: Thrine C. Harpring, Centreville, VA (US)

( * ) Notice: Subject to any disclaimer, the term of this patent is extended or adjusted under 35 U.S.C. 154(b) by 6 days.

(21) Appl. No.: 16/374,331

(22) Filed: Apr. 3, 2019

(65) Prior Publication Data

US 2019/0321152 A1    Oct. 24, 2019

Related U.S. Application Data

(60) Provisional application No. 62/660,702, filed on Apr. 20, 2018.

(51) Int. Cl.
*A61C 19/02* (2006.01)
*A45C 11/00* (2006.01)
*H04B 1/3888* (2015.01)

(52) U.S. Cl.
CPC .............. *A61C 19/02* (2013.01); *A45C 11/00* (2013.01); *H04B 1/3888* (2013.01); *A45C 2011/002* (2013.01); *A45C 2011/007* (2013.01)

(58) Field of Classification Search
CPC ... A61C 19/02; A45C 11/00; A45C 2011/002; A45C 2011/007; A45C 13/005; A45C 13/02; H04B 1/3888; A45D 33/26; A45D 1/06
USPC .................................................. 206/63.5, 320
See application file for complete search history.

(56) References Cited

U.S. PATENT DOCUMENTS

| | | | | |
|---|---|---|---|---|
| 5,063,940 A | * | 11/1991 | Adell | A63B 71/085 128/861 |
| 6,881,273 B1 | * | 4/2005 | Oberman | A45F 5/004 134/6 |
| 7,201,271 B1 | * | 4/2007 | Saad | A45C 11/00 132/315 |
| 7,318,522 B2 | * | 1/2008 | Adam | A61C 19/02 206/369 |
| 9,408,446 B2 | * | 8/2016 | Liebers | A45C 11/04 |
| 2011/0192857 A1 | * | 8/2011 | Rothbaum | F16M 11/041 220/694 |
| 2013/0095898 A1 | * | 4/2013 | Altschul | H04M 1/0283 455/575.8 |
| 2015/0128491 A1 | * | 5/2015 | Aller | A01G 9/022 47/65.5 |
| 2015/0136624 A1 | * | 5/2015 | Konig | A46B 15/0091 206/361 |
| 2016/0064993 A1 | * | 3/2016 | Fetterman | H02J 7/0042 320/137 |
| 2017/0354229 A1 | * | 12/2017 | Berkley | A45C 13/005 |
| 2019/0201177 A1 | * | 7/2019 | Beckerman | A45D 44/18 |

\* cited by examiner

*Primary Examiner* — Chun Hoi Cheung
(74) *Attorney, Agent, or Firm* — Schmeiser, Olsen & Watts LLP

(57) ABSTRACT

An orthodontic appliance case for use with a mobile computing device. The orthodontic appliance case has beveled edges and a magnet to removably couple to a mobile computing device. The beveled edges add support to the mobile computing device when propped upward. The orthodontic appliance case may also serve as a support or handle for the user of the mobile computing device.

9 Claims, 6 Drawing Sheets

ORTHODONTIC APPLIANCE CASE

CROSS REFERENCE TO RELATED APPLICATION

This invention claims priority to U.S. provisional patent application Ser. No. 62/660,702, filed Apr. 20, 2018, entitled "Orthodontic Appliance Case," which is incorporated entirely herein by reference.

FIELD OF THE INVENTION

This invention relates generally to an orthodontic appliance case and more particularly, to an orthodontic appliance case for use in combination with a mobile computing device.

BACKGROUND

Orthodontic appliances are used by millions of Americans. Often these appliances must be removed when eating. Setting the appliances down on, for example, a napkin, poses potential issues regarding accidental loss. Most young adults carry small mobile computing devices, such as a cell phone or tablet. These mobile computing devices are bigger than an orthodontic appliance or even an orthodontic appliance case and are much harder to misplace.

It is desirable to have a case for holding an orthodontic appliance that is not easily lost. It is further desirable to have an orthodontic appliance case that can have multiple uses.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
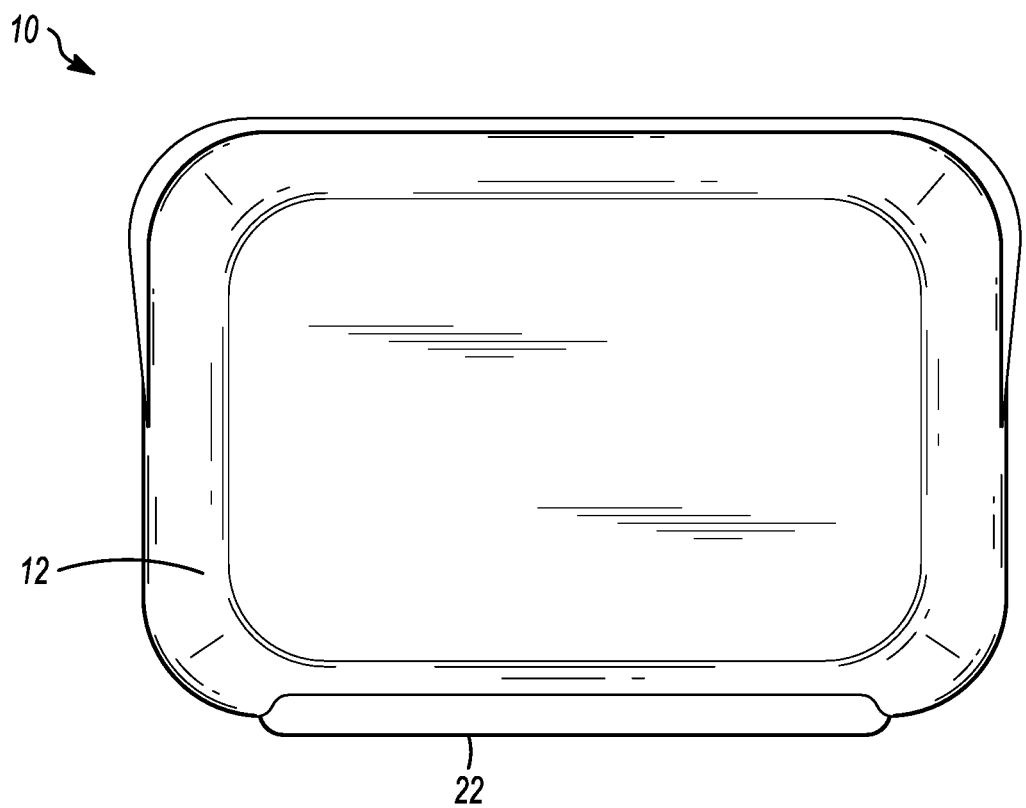
FIG. 1 is a top view of an orthodontic appliance case according to the invention.
Figure 2:
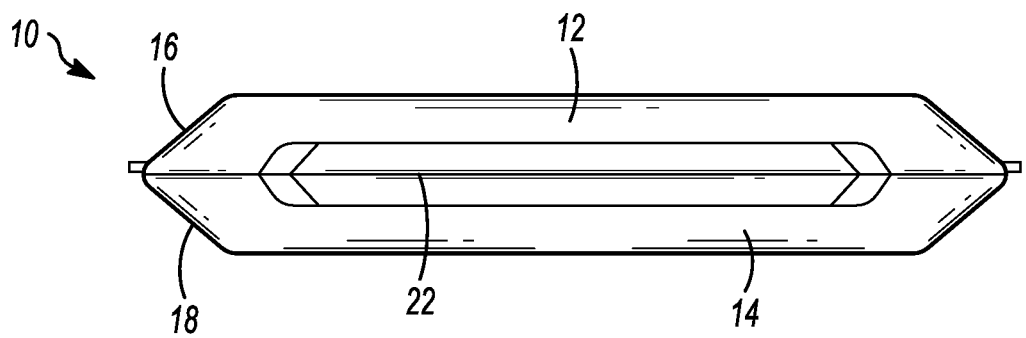
FIG. 2 is a rear side view of an orthodontic appliance case according to the invention.
Figure 3:
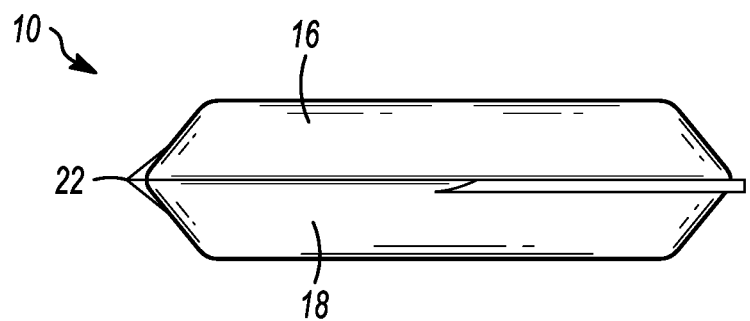
FIG. 3 is a left side view of an orthodontic appliance case according to the invention.
Figure 4:
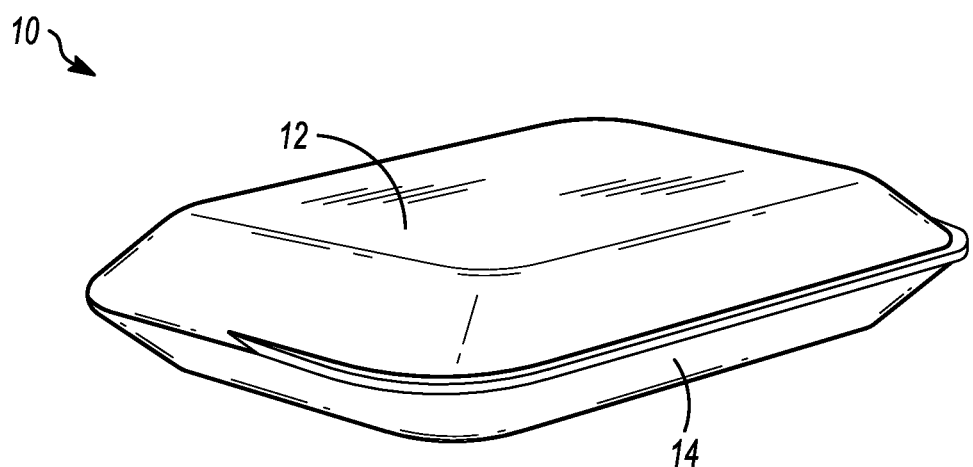
FIG. 4 is a perspective view of an orthodontic appliance case according to the invention.
Figure 5:
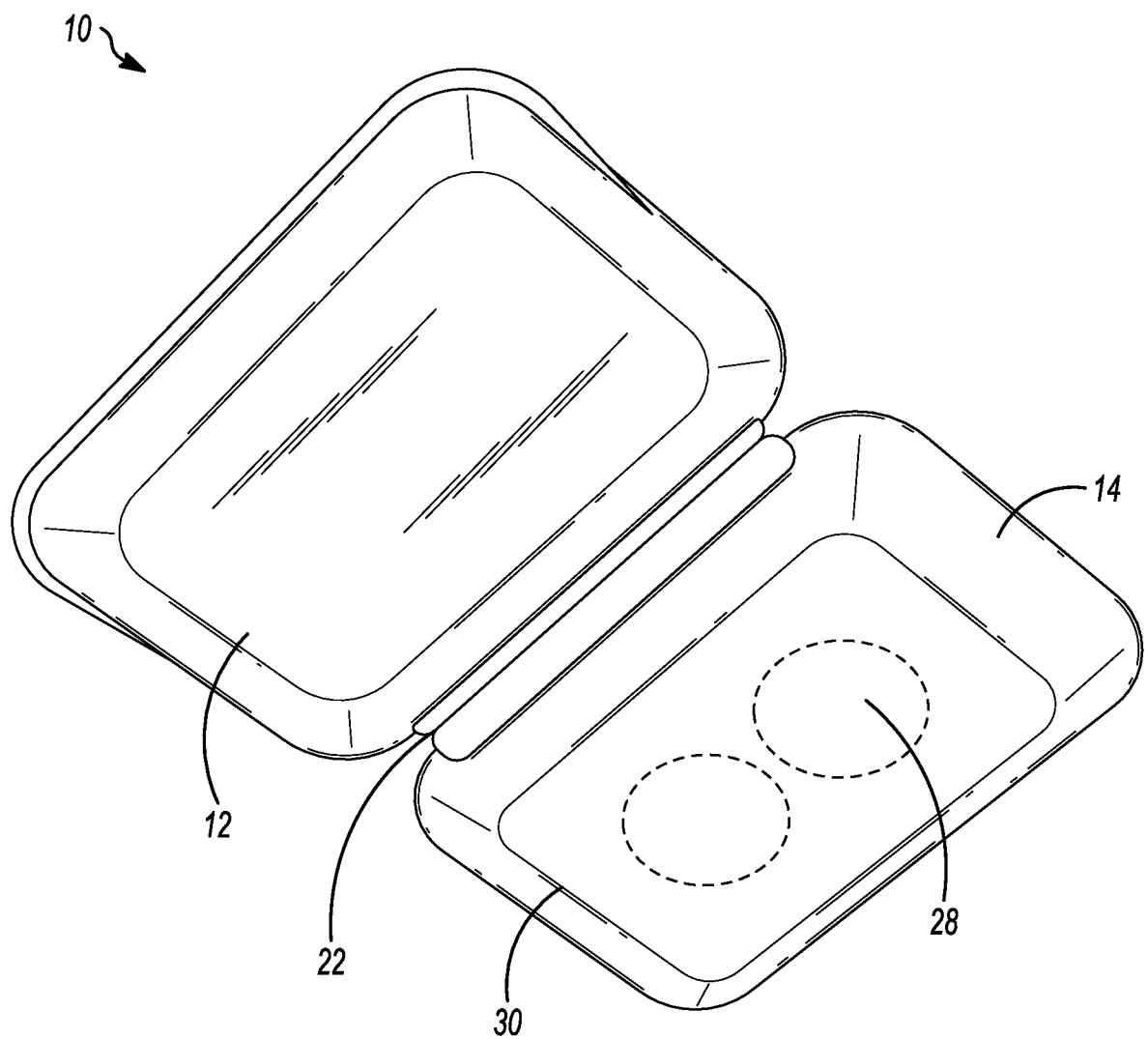
FIG. 5 is a bottom open perspective view of an orthodontic appliance case according to the invention.
Figure 6:
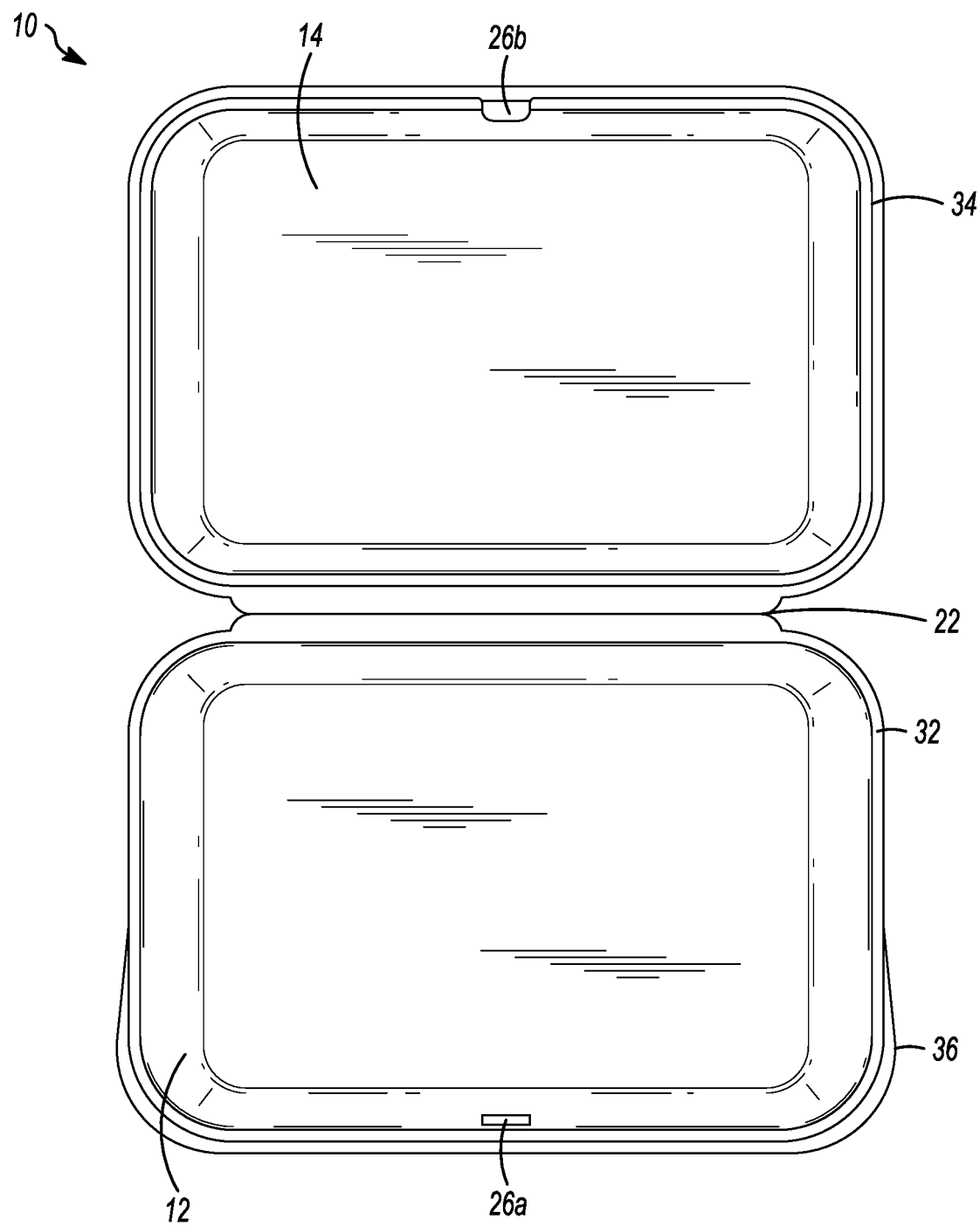
FIG. 6 is a top open view of an orthodontic appliance case according to the invention.
Figure 7:
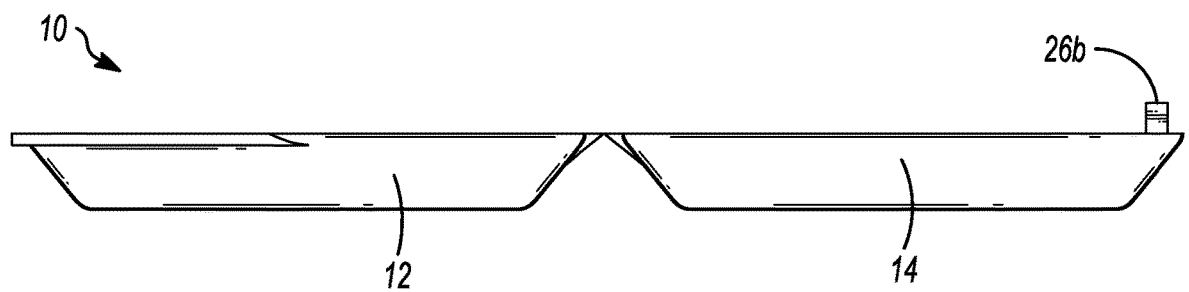
FIG. 7 is a left open view of an orthodontic appliance case according to the invention.
Figure 8:
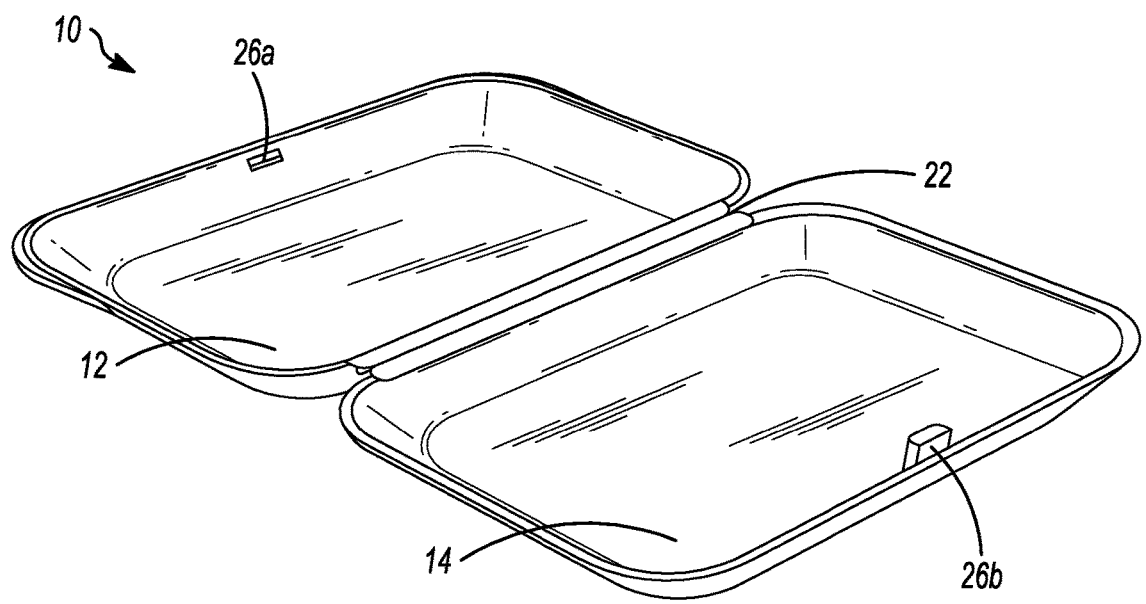
FIG. 8 is a top open perspective view of an orthodontic appliance case according to the invention.

Disclosed herein is an orthodontic appliance case, wherein the orthodontic appliance case comprises a top portion having an exterior top surface and a beveled top edge; and a bottom portion having an exterior bottom surface, a beveled bottom edge and at least one securement means. The beveled top and bottom edges may be at an angle of about 45 degrees. The at least one securement means may be a magnetic portion embedded in the bottom portion and covered with a sheet portion. The at least one securement means may be a magnetic portion located on the exterior bottom surface. The top portion may have an outwardly extending peripheral flange. The top portion may be provided with a top lip portion extending about its periphery and the bottom portion may be provided with a bottom lip portion extending about its periphery. The bottom lip portion may be received within the top lip portion or vice versa.

Disclosed herein is a combination orthodontic appliance case and a mobile computing device, comprising a mobile computing device; and an orthodontic appliance case, wherein the orthodontic appliance case comprises: a top portion having an exterior top surface and a beveled top edge; and a bottom portion having an exterior bottom surface, a beveled bottom edge and at least one magnetic portion, wherein the orthodontic appliance case is removably coupled to a back surface of the mobile computing device with the at least one magnetic portion. The back surface of the mobile computing device may be a mobile computing device case. The back surface of the mobile computing device may have a metal plate. The metal plate may be coupled to the back surface of the mobile computing device case with an adhesive. The beveled top and bottom edges may be at an angle of about 45 degrees. The at least one magnetic portion may be embedded in the bottom portion. The at least one magnetic portion may be located on the exterior bottom surface. The top portion may be provided with a top lip portion extending about its periphery and the bottom portion may be provided with a bottom lip portion extending about its periphery. The bottom lip portion may be received within the top lip portion or vice versa.

Disclosed herein is an orthodontic appliance case kit for coupling to a mobile computing device, wherein the orthodontic appliance case kit comprises a metal plate having an adhesive on a back surface; and an orthodontic appliance case comprising a top portion having an exterior top surface and a beveled top edge; a bottom portion having an exterior bottom surface, a beveled bottom edge and at least one magnetic portion. The beveled top and bottom edges may be at an angle of about 45 degrees. The magnetic portion may be embedded in the bottom portion. The magnetic portion may be located on the exterior bottom surface. The top portion may be provided with a top lip portion extending about its periphery and the bottom portion may be provided with a bottom lip portion extending about its periphery. The bottom lip portion may be received within the top lip portion or vice versa.

Figure 9:
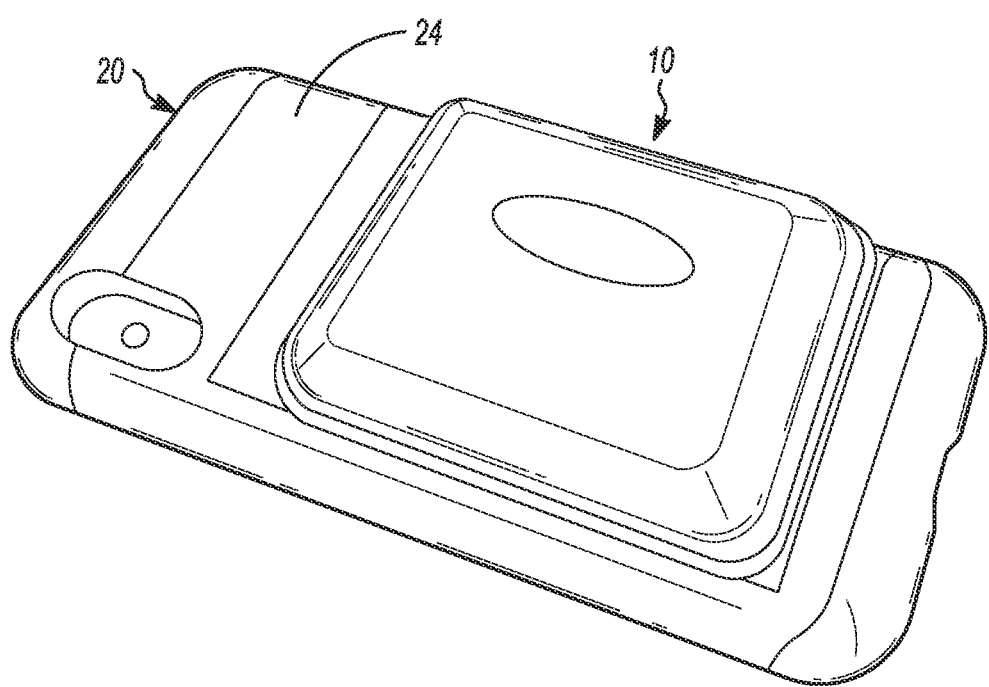
FIG. 9 is a perspective view of a cell phone and combination orthodontic case according to the invention

As shown in FIGS. 1 to 9, orthodontic appliance case 10 comprises a top portion 12 and a bottom portion 14 connected by hinge 22 and closed with a clasp made of two portions 26a and 26b. Top portion 12 may include indicia such as letters, symbols and/or numbers for example, an advertisement. Top portion 12 and bottom portion 14 have a beveled edge 16 and 18, respectively at about a 45 degree angle. FIGS. 1-4 show orthodontic appliance case 10 in a closed position. FIGS. 5-8 show orthodontic appliance case 10 in an open position. Bottom portion 14 includes securement means, such as two magnets 28 (or a hook and loop fastener) and sheet portion 30. FIG. 9 shows orthodontic appliance case 10 coupled to a back surface 24 of mobile computing device 20.

Top portion 12 is provided with an outwardly extending peripheral flange 36 in order for the user to grab top portion 12 and therefore separate top portion 12 from bottom portion 14 in the closed position. Top portion 12 is provided with top lip portion 32 extending about its periphery. Bottom portion 14 is provided with bottom lip portion 34 extending about its periphery. Bottom lip portion 34 is received within top lip portion 32 or vice versa in an interference fit. Top lip portion 32 and bottom lip portion 34 are configured to keep out dirt, debris and/or fluid from orthodontic appliance case 10.

The orthodontic appliance case may be affixed to any mobile computing device or mobile computing device case, particularly a cell phone or a tablet. A metal plate is affixed to the back surface of the mobile computing device or mobile computing device case via conventional attachment means, such as an adhesive strip.

The orthodontic appliance case includes at least one securement means, such as a magnetic portion. The magnetic portion may be on the exterior bottom surface of the bottom portion of the orthodontic appliance case. The magnetic portion may extend from the exterior bottom surface of the bottom portion or may be recessed in the bottom portion. The magnetic portion may include at least one magnet, for example two magnets. The magnets may be circular magnets, for example N52 Neodymium 1" diameter×1/16" thick. The recessed portion may include a sheet portion (polymeric type material) placed over the magnetic portion and may extend over at least a portion of the exterior bottom surface, such as a 45 mm×65 mm high-temperature silicone sheet.

The metal plate works to couple the mobile computing device with the orthodontic appliance case. The magnetic portion of the orthodontic appliance case is configured to attach by a magnetic force to the metal plate, thereby coupling the orthodontic appliance case to the mobile computing device. The metal plate may be an adhesive iron plate, such as a 45 mm×65 mm adhesive iron plate.

The orthodontic appliance case may include beveled edges around the top portion and/or the bottom portion. The beveled edge(s) of the orthodontic appliance case are configured to act as a stand for the mobile computing device. The orthodontic appliance case may also act as a hand grip for the mobile computing device. The beveled edge refers to an edge of the top portion and bottom portion of the orthodontic appliance case that is not perpendicular to the faces of the top portion and bottom portion. The beveled edge may be at an angle of about 45 degrees.

The orthodontic appliance case may hold orthodontic appliances, such as retainers, dentures, aligners and the like. The orthodontic appliance case may also be configured to hold other small items, such as wax, cosmetics, keys, coins, paper currency, identification cards, insurance cards, credit cards, bank cards, gum, breath mints, jewelry, medicine, vitamins, condoms, epinephrine injectors, and the like.

The orthodontic appliance case may include a hinge, such as bendable or flexible hinge. The orthodontic appliance case may include a closure mechanism, such as a clasp. The top portion and bottom portion of the orthodontic appliance case may be fabricated as one piece or separate pieces. The orthodontic appliance case may be opened even when the case is coupled to the exterior surface of the mobile computing device.

The orthodontic appliance case may be made of any suitable polymeric material. The polymeric material may include conventional antimicrobial agents and/or additives. Various agents having antibacterial or antimicrobial properties are known, including agents which can be incorporated in polymer resins, including films, fibers and molded articles. The orthodontic appliance case may be manufactured using suitable materials, including but not limited to acrylonitrile butadiene styrene (ABS), ethylene vinyl acetate (EVA), high impact polystyrene (HIPS), polyethylene (PE), polymethyl methacrylate (PMMA), polypropylene (PP), polystyrene (PS), polyvinyl chloride (PVC), silicone, thermoplastic polyurethane (TPU), and/or mixtures thereof.

Suitable antimicrobial agents and/or additives include, but are not limited to, silver based antimicrobial additives, a mixture of silver and other metals, such as copper. Generally, the antimicrobial additive is added to the polymeric material in amounts in the range of from about 0.5 to about 5% by weight or higher. The antimicrobial additive may also be coated directly on the orthodontic appliance case. The antimicrobial additives will provide protection against harmful bacteria, mold, fungi and viruses, thereby minimizing staining, odors and material degradation of the orthodontic appliance case.

The orthodontic appliance case and metal plate may form an orthodontic appliance case kit. An orthodontic appliance case can be secured safely to the metal plate once the metal plate (for example via adhesive or hard sticker) is adhered to the back surface of a mobile computing device or mobile computing device case. The orthodontic appliance case is removably coupled to the mobile computing device or mobile computing device case using magnetic force. The orthodontic appliance case may also serve as a support or handle for a user of the mobile computing device.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A combination mobile computing device, orthodontic appliance and orthodontic appliance case comprising:
   an orthodontic appliance;
   a mobile computing device; and
   an orthodontic appliance case, wherein the orthodontic appliance case comprises:
   a top portion having an exterior top surface and a beveled top edge; and
   a bottom portion having an exterior bottom surface, a beveled bottom edge and at least one magnetic portion, wherein the orthodontic appliance case is removably coupled to a back surface of the mobile computing device with the at least one magnetic portion, wherein the beveled top and bottom edges are at an angle of about 45 degrees in opposite directions, wherein the beveled top and bottom edges are not perpendicular to the exterior top surface and the exterior bottom surface, and wherein the at least one magnetic portion is embedded in the bottom portion.

2. The combination mobile computing device, orthodontic appliance and orthodontic appliance case of claim 1, wherein the top portion further comprises an outwardly extending peripheral flange.

3. The combination mobile computing device, orthodontic appliance and orthodontic appliance case of claim 1, wherein the back surface is a mobile computing device case.

4. The combination mobile computing device, orthodontic appliance and orthodontic appliance case of claim 1, wherein the back surface of the mobile computing device comprises a metal plate.

5. The combination mobile computing device, orthodontic appliance and orthodontic appliance case of claim 4, wherein the metal plate is coupled to the back surface of the mobile computing device case with an adhesive.

6. The combination mobile computing device, orthodontic appliance and orthodontic appliance case of claim 1, wherein the magnetic portion embedded in the bottom portion is covered with a sheet portion.

7. The combination mobile computing device, orthodontic appliance and orthodontic appliance case of claim 6, wherein the sheet portion comprises a silicone sheet.

8. The combination mobile computing device, orthodontic appliance and orthodontic appliance case of claim 1, wherein the top portion is provided with a top lip portion extending about its periphery and the bottom portion is provided with a bottom lip portion extending about its periphery, and wherein the bottom lip portion is received within the top lip portion or vice versa.

9. The combination mobile computing device, orthodontic appliance and orthodontic appliance case of claim 1, wherein the orthodontic appliance is a retainer.

\* \* \* \* \*